(12) United States Patent
Oguro

(10) Patent No.: US 11,890,948 B2
(45) Date of Patent: Feb. 6, 2024

(54) CONTROL APPARATUS FOR ELECTRIC VEHICLE

(71) Applicant: SUBARU CORPORATION, Tokyo (JP)

(72) Inventor: Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 324 days.

(21) Appl. No.: 17/157,476

(22) Filed: Jan. 25, 2021

(65) Prior Publication Data

US 2021/0268915 A1   Sep. 2, 2021

(30) Foreign Application Priority Data

Mar. 2, 2020   (JP) ................... 2020-034562

(51) Int. Cl.
*B60L 15/20*   (2006.01)
*B60W 10/08*   (2006.01)
*B60W 10/20*   (2006.01)

(52) U.S. Cl.
CPC ......... *B60L 15/2036* (2013.01); *B60W 10/08* (2013.01); *B60W 10/20* (2013.01); *B60L 2240/14* (2013.01); *B60L 2240/24* (2013.01); *B60L 2240/26* (2013.01); *B60L 2240/423* (2013.01); *B60W 2510/084* (2013.01); *B60W 2520/406* (2013.01); *B60W 2530/10* (2013.01);
(Continued)

(58) Field of Classification Search
None
See application file for complete search history.

(56) References Cited

U.S. PATENT DOCUMENTS

2007/0038340 A1   2/2007   Sekiguchi et al.
2018/0281603 A1*  10/2018  Nordmann ........... B60K 7/0007
(Continued)

FOREIGN PATENT DOCUMENTS

JP   2007-049825 A   2/2007
JP   2016-086535 A   5/2016

OTHER PUBLICATIONS

Japanese Office Action dated Aug. 15, 2023, in corresponding Japanese Patent Application No. 2020-034562, with an English translation thereof.

*Primary Examiner* — Thomas E Worden
(74) *Attorney, Agent, or Firm* — MCGINN I.P. LAW GROUP, PLLC

(57) ABSTRACT

A control apparatus for an electric vehicle includes a requested torque calculator, a command torque calculator, and a driving controller. The requested torque calculator is configured to calculate requested torque. The command torque calculator includes a change rate adjuster configured to adjust respective upper limit change rates of left command torque and right command torque that follow the requested torque. The change rate adjuster is configured to, on the basis of a predetermined operation of turning back a steering angle performed on a steering unit of the electric vehicle, lower the upper limit change rate of a driving wheel, serving as an inner wheel among left and right driving wheels of the electric vehicle before turning back the steering angle, than the upper limit change rate of the driving wheel, serving as an outer wheel among the left and the right driving wheels before turning back the steering angle.

9 Claims, 3 Drawing Sheets

(52) U.S. Cl.
CPC ... *B60W 2710/20* (2013.01); *B60W 2720/106* (2013.01); *B60W 2720/125* (2013.01)

(56) References Cited

U.S. PATENT DOCUMENTS

| | | | |
|---|---|---|---|
| 2019/0193783 A1* | 6/2019 | Uemura | B60L 15/32 |
| 2019/0359197 A1* | 11/2019 | Kaimer | B60K 17/046 |
| 2020/0339099 A1* | 10/2020 | Lapis | B60W 30/04 |
| 2021/0245757 A1* | 8/2021 | Imamura | B60T 7/18 |

* cited by examiner

CONTROL APPARATUS FOR ELECTRIC VEHICLE

CROSS REFERENCE TO RELATED APPLICATIONS

The present application claims priority from Japanese Patent Application No. 2020-034562 filed on Mar. 2, 2020, the entire contents of which are hereby incorporated by reference.

BACKGROUND

The technology relates to a control apparatus for an electric vehicle.

In recent years, electric vehicles including a left driving motor and a right driving motor that are independent from each other have been developed. Japanese Unexamined Patent Application Publication No. 2007-49825 discloses control over output of driving motors performed in a case where a slip occurs while such an electric vehicle is turning.

SUMMARY

An aspect of the technology provides a control apparatus for an electric vehicle. The electric vehicle includes a steering unit, an accelerator operation unit, a left driving motor configured to output power of a left driving wheel, and a right driving motor configured to output power of a right driving wheel. The control apparatus is configured to be installed in the electric vehicle. The control apparatus includes a requested torque calculator, a command torque calculator, and a driving controller. The requested torque calculator is configured to calculate requested torque that is based on an operation performed on the accelerator operation unit. The command torque calculator includes a change rate adjuster. The change rate adjuster is configured to adjust respective upper limit change rates of left command torque and right command torque that follow the requested torque. The command torque calculator is configured to calculate the left command torque and the right command torque. The driving controller is configured to control the left driving motor and the right driving motor to cause the left driving motor to output the calculated left command torque and the right driving motor to output the calculated right command torque. The change rate adjuster is configured to, on the basis of a predetermined operation of turning back a steering angle performed on the steering unit, lower the upper limit change rate of the driving wheel, serving as an inner wheel among the left and the right driving wheels before turning back the steering angle, than the upper limit change rate of the driving wheel, serving as an outer wheel among the left and the right driving wheels before turning back the steering angle.

An aspect of the technology provides a control apparatus for an electric vehicle. The electric vehicle includes a steering unit, an accelerator operation unit, a left driving motor configured to output power of a left driving wheel, and a right driving motor configured to output power of a right driving wheel. The control apparatus is configured to be installed in the electric vehicle. The control apparatus includes circuitry configured to calculate requested torque that is based on an operation performed on the accelerator operation unit, calculate left command torque and right command torque that follow the requested torque, adjust respective upper limit change rates of the left command torque and the right command torque, in which the circuitry is configured to, on the basis of a predetermined operation of turning back a steering angle performed on the steering unit, lower the upper limit change rate of the driving wheel, serving as an inner wheel among the left and the right driving wheels before turning back the steering angle, than the upper limit change rate of the driving wheel, serving as an outer wheel among the left and the right driving wheels before turning back the steering angle, and control the left driving motor and the right driving motor to cause the left driving motor to output the calculated left command torque and the right driving motor to output the calculated right command torque.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
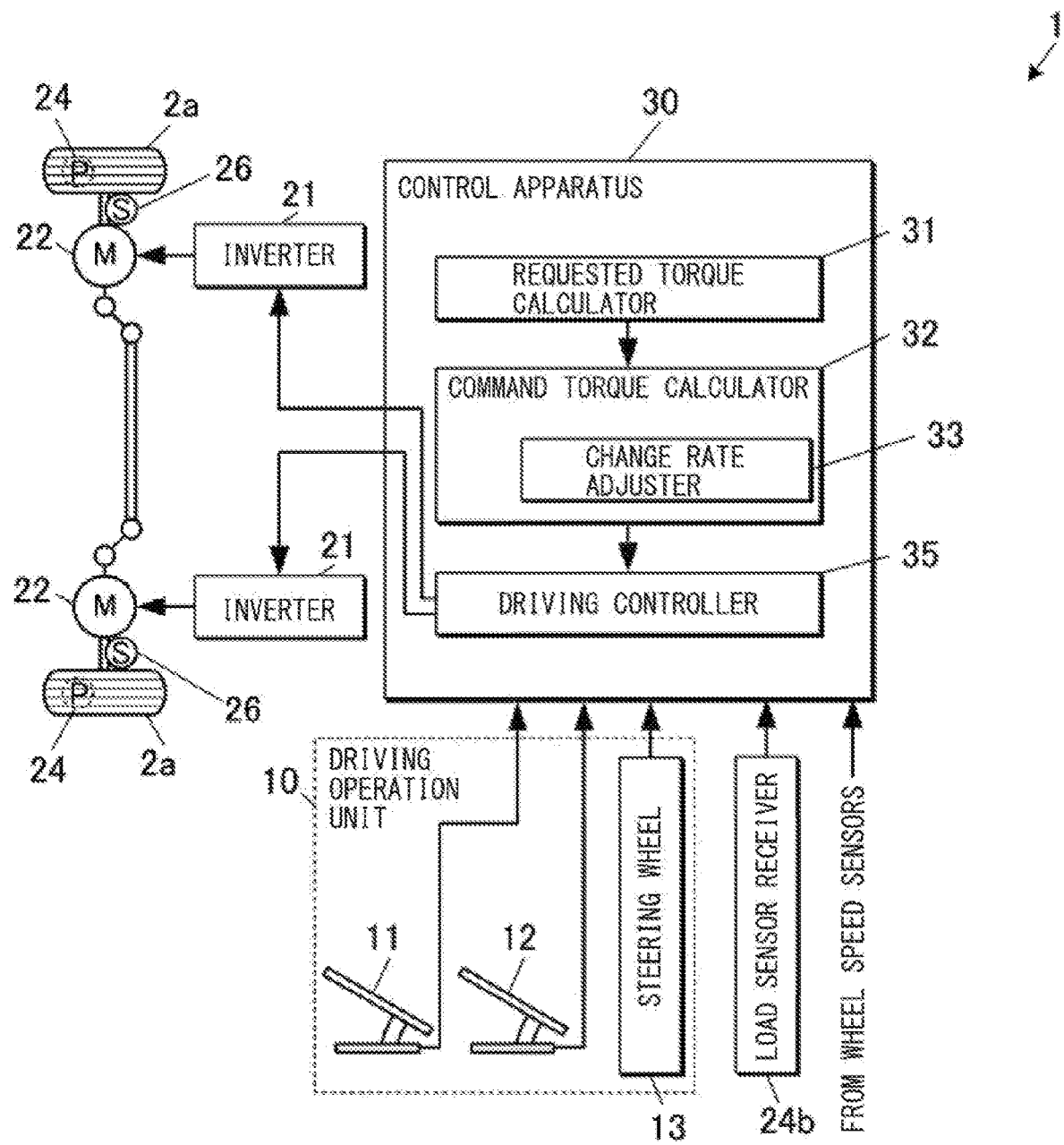
FIG. 1 is a block diagram illustrating an electric vehicle according to one example embodiment of the technology.

In a case where occurrence of a slip is expected, better drivability of a vehicle is obtained by suppressing torque before the slip occurs rather than suppressing torque after the slip occurs. When the vehicle is switched from turning to straight driving on a road surface with low friction resistance, sometimes a driving wheel serving as an inner wheel can slip and drivability of the vehicle can be deteriorated.

It is desirable to provide a control apparatus for an electric vehicle, including a left driving motor and a right driving motor that are independent from each other, that makes it possible to suppress deterioration in drivability of the vehicle when the electric vehicle is switched from turning to straight driving.

Hereinafter, an example embodiment of the technology will be described in detail with reference to drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

FIG. 1 is a block diagram illustrating an electric vehicle according to an example embodiment of the technology.

An electric vehicle 1 according to the present example embodiment may be any electrically-driven vehicle such as an electric vehicle (EV) or a hybrid electric vehicle (HEV). The electric vehicle 1 may include driving wheels 2*a* (left driving wheel 2*a*L and right driving wheel 2*a*R), driving motors 22 (left driving motor 22L and right driving motor 22R) that output power to the left and right driving wheels 2*a* independently, inverters 21 (left inverter 21L and right inverter 21R) that drive the left and right driving motors 22 independently, and a control apparatus 30 that controls driving of the electric vehicle 1. In addition, the electric vehicle 1 may include a driving operation part 10, wheel speed sensors 26 (left wheel speed sensor 26L and right wheel speed sensor 26R) that detect respective wheel speeds of the left and right driving wheels 2*a*, and load sensors 24 (left load sensor 24L and right load sensor 24R) that detect respective loads applied to the left and right driving wheels 2*a*. The driving operation part 10 may include an accelerator pedal 11, a brake pedal 12, and a steering wheel 13. Respective detection results of the left and right wheel speed sensors 26 may be transmitted to the control apparatus 30. Respective detection results of the left and right load sensors 24 may be transmitted to the control apparatus 30 via a load sensor receiver 24*b*. In one embodiment, the accelerator pedal 11 may serve as an "accelerator operation unit". In one embodiment, the steering wheel 13 may serve as a "steering unit".

The load sensors 24 may be attached to inner surfaces of tires of the driving wheels 2*a* and estimate loads applied to the driving wheels 2*a* by measuring distortion of the tires during driving.

The control apparatus 30 may include a single electronic control unit (ECU) or a plurality of ECUs. In a case where the control apparatus 30 includes the plurality of ECUs, the plurality of ECUs may communicate with each other and operate in cooperation with each other. The control apparatus 30 may include read only memory (ROM) that stores a control program, and a central processing unit (CPU) that performs a calculation process. The CPU may achieve a plurality of operational modules by executing the control program. The plurality of operational modules may include a requested torque calculator 31, a command torque calculator 32, and a driving controller 35. The requested torque calculator 31 may calculate requested torque on the basis of an operation signal transmitted from the driving operation part 10. The command torque calculator 32 may calculate left command torque and right command torque that suppress rapid change in torque but follow the requested torque. The driving controller 35 may control the left and right inverters 21 to cause the left and right driving motors 22 to output the calculated left command torque and right command torque, respectively.

The requested torque calculator 31 may calculate requested torque commensurate with an amount of operation of the accelerator pedal 11 or the brake pedal 12, for example. The requested torque can change rapidly when a driver operates the accelerator pedal 11 or the brake pedal 12 rapidly.

In normal times in which the left and right driving wheels 2*a* do not spin out, the command torque calculator 32 may calculate command torques that follow the requested torques at change rates that do not exceed upper limit change rates. In addition, the command torque calculator 32 may calculate the left command torque and the right command torque in such a manner that the sum of the left command torque and the right command torque follows the requested torque. A standard distribution ratio between the left command torque and the right command torque may be 1:1, but the distribution ratio may be changed under a predetermined condition. Because the command torques are calculated at the change rates that do not exceed the upper limit change rates, it is possible to gently change output torques of the left and right driving wheels 2*a* even if the accelerator pedal 11 is operated rapidly.

The command torque calculator 32 may have a traction control function of suppressing output torques of the driving wheels 2*a* regardless of the requested torques in such a manner that slip rates of the left and right driving wheels 2*a* become a predetermined value or less in a case where the left or right driving wheel 2*a* spins out. It is possible for the command torque calculator 32 to detect spins of the left and right driving wheels 2*a* by using outputs or the like from the left and right wheel speed sensors 26 of the left and right driving wheels 2*a*.

The command torque calculator 32 may include a change rate adjuster 33 that adjusts left and right upper limit change rates under a predetermined condition. The left upper limit change rate may refer to an upper limit of a change rate of torque to be outputted from the left driving motor 22L to the left driving wheel 2*a*L. The right upper limit change rate may refer to an upper limit of a change rate of torque to be outputted from the right driving motor 22R to the right driving wheel 2*a*R. The upper limit change rates may be adjusted by limiting time rates of change in the torques to the upper limit change rates. Alternatively, the upper limit change rates may be adjusted by adjusting a time constant of a first order lag filter in a case where the command torque following the requested torque is calculated by using the first order lag filter.

In a case where a predetermined operation of turning back a steering angle (a predetermined steering-angle-turning-back operation) is performed on the steering wheel 13 and loads applied to the left and right driving wheels 2*a* satisfy a predetermined condition, the change rate adjuster 33 lowers the upper limit change rate of the driving wheel 2*a*, serving as an inner wheel before turning back the steering angle, than the upper limit change rate of the driving wheel 2*a*, serving as an outer wheel before turning back the steering angle. Alternatively, the change rate adjuster 33 lowers the upper limit change rate of the driving wheel 2*a*, serving as the inner wheel before turning back the steering angle, than a standard upper limit change rate directed to straight driving.

Figure 2:
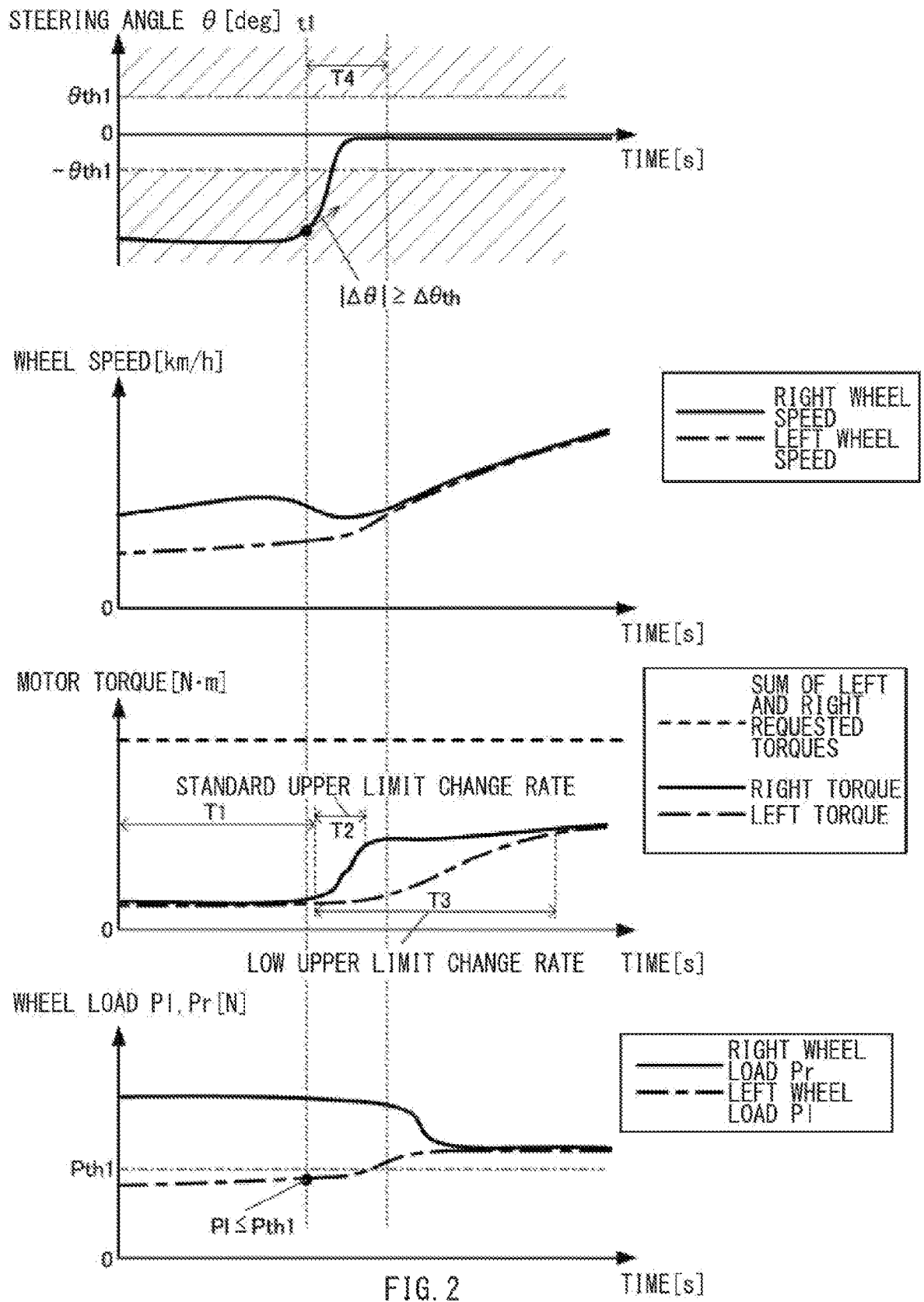
FIG. 2 is a timing diagram illustrating an example of behavior performed when the electric vehicle according to one example embodiment is switched from turning to straight driving.

For example, as illustrated in a graph of steering angle $\theta$ in FIG. 2, the predetermined steering-angle-turning-back operation may be performed, for example, in a case where an absolute value of a steering angle $|\theta|$ is equal to or greater than a steering angle threshold $\theta$th1 and a steering-angle-turning-back speed $|\Delta\theta|$ is equal to or greater than a steering angle change rate threshold $\Delta\theta$th. The steering angle threshold $\theta$th1 and the steering angle change rate threshold $\Delta\theta$th may be positive values. The steering angle threshold $\theta$th1 and the steering angle change rate threshold $\Delta\theta$th may be variable values that change depending on parameters representing a tendency of occurrence of a slip, such as a vehicle speed or a road surface condition.

For example, as illustrated in a graph of wheel loads Pl and Pr in FIG. 2, the predetermined condition of the load may be a condition that a load applied to the driving wheel 2*a*, serving as the inner wheel among the left and right driving wheels 2*a* before turning back a steering angle, is equal to or less than a load threshold Pth1. The load threshold Pth1 may be a variable value that changes depending on the parameters representing the tendency of occurrence of a slip, such as a vehicle speed or a road surface condition.

Behavior Example

FIG. 2 is a timing diagram illustrating an example of behavior performed when the electric vehicle according to the example embodiment is switched from turning to the straight driving. In FIG. 2, lines indicating left torque and right torque illustrated in a graph of motor torque may also serve as lines indicating left command torque and right command torque. One reason for this is that the driving controller 35 drives the left and right driving motors 22 in such a manner that the motor torques match the command torques.

A load center of the electric vehicle 1 may shift forward or backward at a time of braking or acceleration, and shift to the left or right at a time of turning. In a case where a load applied to the driving wheel 2a serving as the inner wheel is decreasing and the steering angle is suddenly turned back, sometimes the decrease in the load applied to the driving wheel 2a serving as the inner wheel may continue for a short period of time due to action of a suspension.

In the behavior example illustrated in FIG. 2, the electric vehicle 1 suddenly shifts from the turning to the straight driving on a road surface with low friction coefficient (road surface μ). In a time period T1 in FIG. 2, a steering angle and vehicle speed upon turning are larger than requested torque, the left or right driving wheel 2a spins out before the time illustrated in FIG. 2, and therefore the traction control is performed. The traction control makes it possible to keep the left command torque and right command torque low and keep the requested torque higher than the sum of the left command torque and the right command torque.

When the electric vehicle 1 shifts from a turning section to a straight section and the driver suddenly turns back the steering wheel 13 at a certain steering angle or more, this may cause a situation where the steering angle |θ| is equal to or greater than the steering angle threshold θth1 and the steering-angle-turning-back speed |Δθ| is equal to or greater than the steering angle change rate threshold Δθth at a steering wheel turning back start timing t1. The change rate adjuster 33 may repeatedly perform a process of determining whether such a situation has occurred. When such a situation is detected, the change rate adjuster 33 may subsequently read values of the load sensors 24 and determine whether a load applied to the driving wheel 2a serving as the inner wheel (load Pl applied to the left wheel) is greater than the load threshold Pth1. If the determination result indicates a positive result (YES), the change rate adjuster 33 may set the upper limit change rate of the inner wheel to a value lower than the standard upper limit change rate. In other words, the upper limit change rate of the inner wheel may be set to a value lower than the upper limit change rate of the outer wheel, which remains at the standard value.

In the last of the traction control time period T1 and at the beginning of turning back the steering angle θ, slip rates of the left and right driving wheels 2a may become a predetermined value or less and the traction control may finish. Next, the command torque calculator 32 may start calculating the left command torque and the right command torque in such a manner that the left command torque and the right command torque follow the left requested torque and the right requested torque. In the behavior example illustrated in FIG. 2, the left command torque and right command torque may be suppressed to be lower than the requested torque at the end of the traction control. Therefore, in time periods T2 and T3 immediately after the end of the traction control, the command torque calculator 32 may increase the left command torque and the right command torque at change rates that are close to the upper limit change rates defined by the change rate adjuster 33. Here, the left upper limit change rate may be set to a lower value while the right upper limit change rate may be set to a standard value. Therefore, as illustrated in the time periods T2 and T3 in FIG. 2, the right command torque may increase relatively suddenly but the left command torque may increase gently. Subsequently, the sum of the left command torque and the right command torque may become almost identical to the requested torque over a relatively long period of time.

In a time period T4 in which the operation of suddenly turning back the steering angle θ is performed, sometimes the load applied to the driving wheel 2a, serving as the inner wheel before turning back the steering wheel 13, may be maintained at a low value. When large torque is applied to the driving wheel 2a while the applied load is low, the driving wheel 2a can slip. However, according to the present example embodiment, the command torque of the driving wheel 2a serving as the inner wheel may increase gently in the time period T4, and the command torque of the driving wheel 2a serving as the inner wheel does not increase suddenly. This makes it possible to suppress the slip of the driving wheel 2a serving as the inner wheel even when the load applied to the driving wheel 2a serving as the inner wheel remains at a low value.

At the timing t1, the change rate adjuster 33 may lower the upper limit change rate of the inner wheel. Subsequently, the change rate adjuster 33 may turn back the upper limit change rate of the inner wheel to the standard value under an appropriate condition, such as a condition that a predetermined period of time has elapsed, a condition that a difference between the left command torque and the right command torque has fallen within a threshold, or other conditions.

Comparative Example

Figure 3:
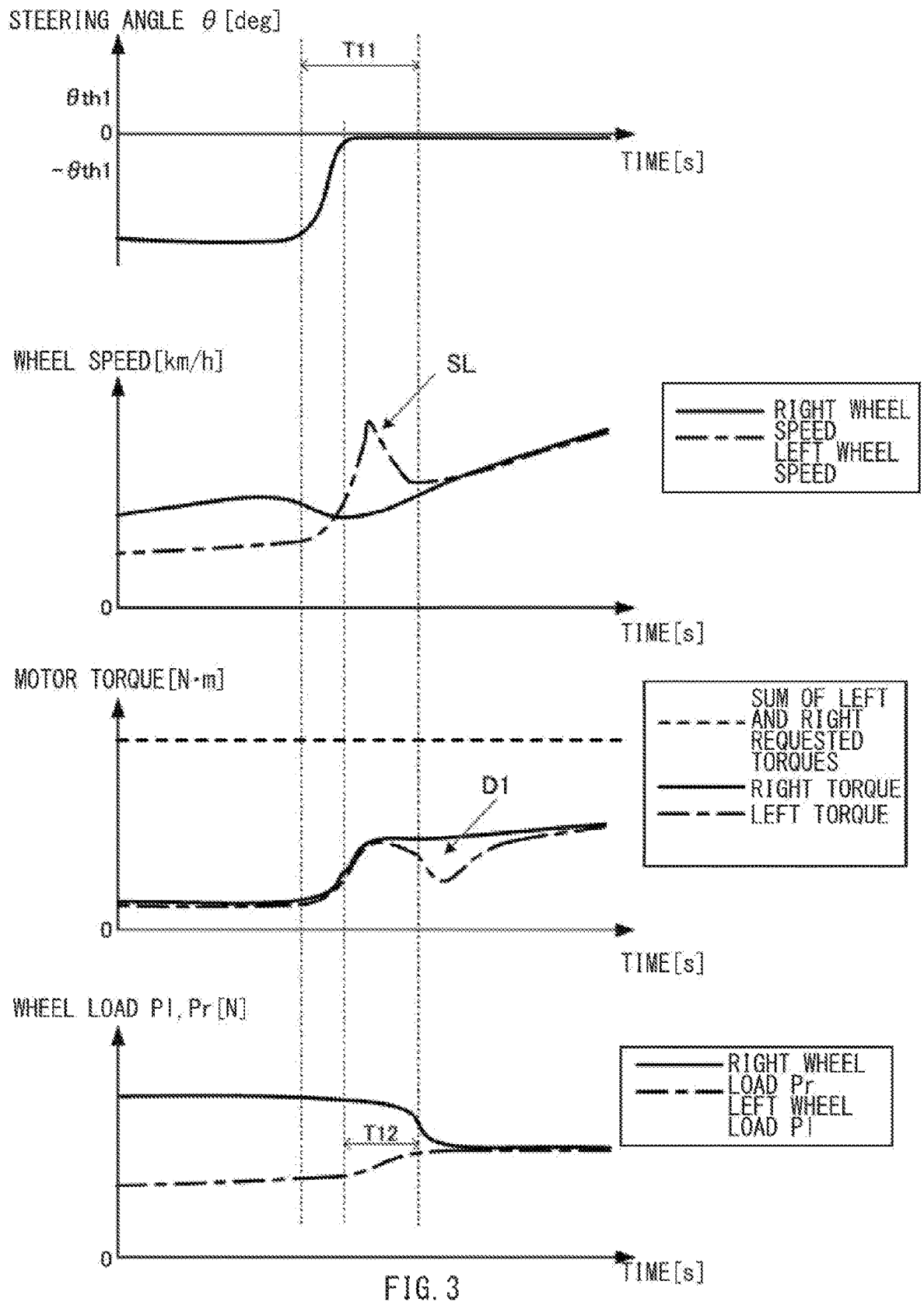
FIG. 3 is a timing diagram illustrating an example of behavior performed when an electric vehicle according to a comparative example is switched from turning to straight driving.

FIG. 3 is a timing diagram illustrating an example of behavior performed when an electric vehicle according to a comparative example is switched from turning to straight driving. The electric vehicle according to the comparative example does not include the operation of the change rate adjuster 33 according to the example embodiment of the technology. In the behavior example illustrated in FIG. 3, a driver drives the electric vehicle in a way similar to the behavior example illustrated in FIG. 2.

When turning back the steering angle θ to shift from the turning section to the straight section as illustrated in FIG. 3 (time period T11), the traction control performed in the turning section finishes, and the command torque calculator increases the left command torque and the right command torque in such a manner that the left command torque and the right command torque follow the requested torque. At this time, the left upper limit change rate and the right upper limit change rate according to the comparative example may remain at standard values. Therefore, sometimes the command torques can be increased relatively suddenly in a time period T12 in which a load applied to the driving wheel 2a serving as the inner wheel remains at a low value even when the steering angle θ is turned back. When large torque is outputted to the driving wheel 2a serving as the inner wheel while the load applied to the driving wheel 2a maintains at the low value, a slip SL of the driving wheel 2a can occur.

After the slip SL has occurred, the traction control is performed, which can cause large or small variation D1 in torque of the driving wheel 2a serving as the inner wheel for a short period of time. Such variation D1 can deteriorate drivability of the electric vehicle.

In contrast, the electric vehicle 1 according to the present example embodiment suppresses the occurrence of the above-described slip SL, and suppresses the deterioration in drivability of the electric vehicle 1 when shifting from the turning section to the straight section.

It is to be noted that the behavior examples illustrated in FIGS. 2 and 3 indicate behaviors performed when the traction control is performed during the turning, and these behavior examples indicate an advantage of the present example embodiment compared to the comparative example. In addition, the present example embodiment is also advantageous in comparison with the comparative example in a case of relatively suddenly increasing an amount of depressing the accelerator pedal 11 while the electric vehicle 1 is switched from the turning, where the traction control is not performed, to the straight driving. In other words, when suddenly increasing an amount of depressing the accelerator pedal 11 at the time of switching to the straight driving as described above, the command torques of the electric vehicle according to the comparative example can increase and the electric vehicle according to the comparative example can tend to perform behavior that is similar to the above-described slip SL in a time period in which the load applied to the driving wheel serving as the inner wheel remains at a low value. In contrast, the electric vehicle 1 according to the present example embodiment is less likely to cause the slip SL because the command torque of the driving wheel 2a increases gently in the time period in which the load applied to the driving wheel 2a serving as the inner wheel maintains at the low value. This allows the electric vehicle 1 according to the present example embodiment to suppress the deterioration in drivability of the electric vehicle 1 when driving the electric vehicle 1 as described above.

In addition, according to the above-described example embodiment, the command torque calculator 32 may determine whether the load applied to the driving wheel 2a serving as the inner wheel is equal to or less than the load threshold Pth1 in response to the operation of suddenly turning back the steering angle, and lower the upper limit change rate of the inner wheel on the basis of a result of the determination. However, for example, it is also possible to estimate how much the reduction in the load applied to the driving wheel 2a serving as the inner wheel is maintained in a case where the operation of suddenly turning back the steering angle is performed at a certain vehicle speed or more. Accordingly, in some embodiments, the process of comparing the load applied to the driving wheel 2a serving as the inner wheel with the load threshold Pth1 may be omitted, and the change rate adjuster 33 may lower the upper limit change rate of the inner wheel any time when the steering angle is turned back suddenly at a predetermined vehicle speed or more. It is also possible for such a configuration to similarly achieve the above-described workings when switching from the turning to the straight driving.

As described above, when the predetermined steering-angle-turning-back operation is performed on the steering wheel 13 of the electric vehicle 1 according to the present example embodiment, the change rate adjuster 33 lowers the upper limit change rate of the driving wheel 2a serving as the inner wheel than the upper limit change rate of the driving wheel 2a serving as the outer wheel. This makes it possible to gently increase the command torque of the driving wheel 2a serving as the inner wheel, even when the sudden steering-angle-turning-back operation has caused the reduction in the load applied to the driving wheel 2a serving as the inner wheel for a while and has caused the increase in the requested torque accordingly. Hence, it is possible to suppress a slip of the driving wheel 2a to which a low load is applied, and to suppress the deterioration in drivability of the electric vehicle 1.

In some embodiments, the change rate adjuster 33 of the electric vehicle 1 according to the present example embodiment may check a load applied to the driving wheel 2a serving as the inner wheel on the basis of turning back of the steering angle of the steering wheel 13 with a predetermined suddenness or more. Next, in a case where the load is equal to or less than the load threshold Pth1, the change rate adjuster 33 may adjust the upper limit change rate. Therefore, the upper limit change rate is adjusted and the occurrence of the slip is suppressed only in a case where a load is low and where there is a high possibility of the slip unless adjustment is performed accordingly. In a case where the load is recovered and there is a low possibility of the slip accordingly, the adjustment of the upper limit change rate is omitted, making it possible to perform control in such a manner that the torque is recovered quickly.

In some embodiments, the command torque calculator 32 of the electric vehicle 1 according to the present example embodiment may have the traction control function of suppressing the command torque on the basis of the detection of spin of the driving wheel 2a regardless of requested torque. As described in the behavior examples illustrated in FIGS. 2 and 3, sometimes the traction control function can cause separation between the requested torque and the command torque when the electric vehicle having the traction control function shifts from the turning to the straight driving. This can tend to cause the slip SL as illustrated in FIG. 3 after shifting to the straight driving and the traction control finishes. According to the present example embodiment, it is possible to suppress such a slip S. Accordingly, the present example embodiment is especially effective for the electric vehicle 1 having the traction control function.

The example embodiment of the technology has been described above. However, the technology is not limited to the above-described example embodiment. For example, in the above example embodiment, the behavior example of the electric vehicle 1 in which the driver performs the steering and the accelerator operation has been described. However, the steering and the accelerator operation of the electric vehicle may be performed by an automated driving system, for example. In this case, forms of the steering unit and the accelerator operation unit are not limited to forms of the steering wheel and the accelerator pedal. In addition, in the above-described example embodiment, the electric vehicle including the two driving wheels (left and right driving wheels) that are driven independently from each other has been described. However, the electric vehicle according to an example embodiment of the technology may be an electric vehicle including four driving wheels (front-left driving wheel, front-right driving wheel, rear-left driving wheel, and rear-right driving wheel) that are driven independently from each other. In this case, the electric vehicle may be configured in such a manner that the upper limit change rates may be adjusted in a process of calculating the command torques of the front-left driving wheel and the front-right driving wheel (two front driving wheels), and the upper limit change rates may also be adjusted in a process of calculating the command torques of the rear-left driving wheel and the rear-right driving wheel (two rear driving wheels). In addition, in the above-described example embodiment, the sensors attached to the inner surfaces of the tires have been described as the load sensors. However, a method of measuring the loads is not specifically limited. For example, it is also possible to measure the loads applied to respective driving wheels from amounts of distortion of suspensions of the driving wheels. In addition, in the above-described example embodiment, the torque has been described as a calculation target. However, the torque may be considered as driving force. The driving force and the torque has a predetermined relation; therefore, a configuration that treats the driving force as the calculation target may be deemed to be correspond to a configuration that treats the torque as a calculation target. Any other details described in the example embodiment may be appropriately modified without departing from the scope of the technology.

According to the example embodiment of the technology, the change rate adjuster lowers the upper limit change rate of the inner wheel than the upper limit change rate of the outer wheel on the basis of the predetermined steering-angle-turning-back operation when switching from the turning to the straight driving. This makes it possible to suppress a possibility of the occurrence of the slip due the increase in the command torque of the driving wheel to a large value with the load applied to the driving wheel, serving as the inner wheel, being maintained at a low value during or after the steering-angle-turning-back operation. Accordingly, it is possible to suppress the deterioration in drivability of the electric vehicles in a case of, for example, switching from the turning to the straight driving.

One or more of the requested torque calculator 31, the command torque calculator 32, and the driving controller 35 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of one or more of the requested torque calculator 31, the command torque calculator 32, and the driving controller 35. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of one or more of the requested torque calculator 31, the command torque calculator 32, and the driving controller 35 illustrated in FIG. 1.

The invention claimed is:

1. A control apparatus for an electric vehicle, the electric vehicle including a steering unit, an accelerator operation unit, a left driving motor configured to output power of a left driving wheel, and a right driving motor configured to output power of a right driving wheel, the control apparatus being configured to be installed in the electric vehicle, the control apparatus comprising:
a processor configured to:
calculate requested torque that is based on an operation performed on the accelerator operation unit; and
adjust respective upper limit change rates of left command torque and right command torque that follow the requested torque, the processor being configured to calculate the left command torque and the right command torque; and
a driving controller configured to control the left driving motor and the right driving motor to cause the left driving motor to output the calculated left command torque and the right driving motor to output the calculated right command torque;
wherein the processor is further configured to, on a basis of a predetermined operation of turning back a steering angle performed on the steering unit wherein a steering direction determined from tracking the steering angle over time switches from a first steering direction to a second steering direction and the second steering direction is opposite from the first steering direction and/or different from the first steering direction by more than a predetermined angle, lower a first upper limit change rate of a first driving wheel among the left driving wheel and the right driving wheel serving as an inner wheel before turning back the steering angle, than a second upper limit change rate of a second driving wheel among the left driving wheel and the right driving wheel serving as an outer wheel before turning back the steering angle, and
wherein before turning back the steering angle comprises an instant in time where a first absolute value of the steering angle is equal to or greater than a predetermined steering angle threshold value and a second absolute value of the rate of change of the steering angle over a predetermined time period is equal to or greater than a predetermined steering angle change rate threshold value.

2. The control apparatus for the electric vehicle according to claim 1,
wherein the control apparatus is configured to be installed in the electric vehicle that further includes load sensors configured to detect a left load applied to the left driving wheel and a right load applied to the right driving wheel,
wherein, in a case where a first load from among the left load and the right load applied to the first driving wheel among the left driving wheel and the right driving wheel serving as the inner wheel before turning back the steering angle, is equal to or less than a load threshold, the processor is configured to, on the basis of the predetermined operation of turning back the steering angle performed on the steering unit, lower the upper limit change rate of the first driving wheel among the left driving wheel and the right driving wheel serving as the inner wheel before turning back the steering angle, than the upper limit change rate of the second driving wheel among the left driving wheel and the right driving wheel serving as the outer wheel before turning back the steering angle.

3. The control apparatus for the electric vehicle according to claim 1, wherein the processor is configured to reduce the left command torque or the right command torque on a basis of detection of slip of the left driving wheel or the right driving wheel.

4. The control apparatus for the electric vehicle according to claim 2, wherein the processor is configured to reduce the left command torque or the right command torque on a basis of detection of slip of the left driving wheel or the right driving wheel.

5. The control apparatus for the electric vehicle according to claim 1, wherein the processor lowers the first upper limit change rate of the first driving wheel, serving as the inner wheel before turning back the steering angle, than the second upper limit change rate directed to a straight driving direction.

6. The control apparatus for the electric vehicle according to claim 1, wherein the processor repeatedly changes the first upper limit change rate according to a steering of direction of the first driving wheel and the second driving wheel.

7. A control apparatus for an electric vehicle, the electric vehicle including a steering unit, an accelerator operation unit, a left driving motor configured to output power of a left driving wheel, and a right driving motor configured to output power of a right driving wheel, the control apparatus being configured to be installed in the electric vehicle, the control apparatus comprising:
   circuitry configured to:
      calculate requested torque that is based on an operation performed on the accelerator operation unit;
      calculate left command torque and right command torque that follow the requested torque;
      adjust respective upper limit change rates of the left command torque and the right command torque; and
      control the left driving motor and the right driving motor to cause the left driving motor to output the calculated left command torque and the right driving motor to output the calculated right command torque, and
   wherein the circuitry is further configured to, on a basis of a predetermined operation of turning back a steering angle performed on the steering unit wherein a steering direction determined from tracking the steering angle over time switches from a first steering direction to a second steering direction and the second steering direction is opposite from the first steering direction and/or different from the first steering direction by more than a predetermined angle, lower a first upper limit change rate of a first driving wheel among the left driving wheel and the right driving wheel serving as an inner wheel before turning back the steering angle, than a second upper limit change rate of a second driving wheel among the left driving wheel and the right driving wheel serving as an outer wheel before turning back the steering angle, and
   wherein before turning back the steering angle comprises at an instant in time where a first absolute value of the steering angle is equal to or greater than a predetermined steering angle threshold value and a second absolute value of the rate of change of the steering angle over a predetermined time period is equal to or greater than a predetermined steering angle change rate threshold value.

8. The control apparatus for an electric vehicle according to claim 7, wherein the control apparatus is configured to be installed in the electric vehicle that further includes load sensors configured to detect a left load applied to the left driving wheel and a right load applied to the right driving wheel,
   wherein, in a case where a first load from among the left load and the right load applied to the first driving wheel among the left driving wheel and the right driving wheel serving as the inner wheel before turning back the steering angle, is equal to or less than a load threshold, the circuitry is configured to, on the basis of the predetermined operation of turning back the steering angle performed on the steering unit, lower the upper limit change rate of the first driving wheel among the left driving wheel and the right driving wheel serving as the inner wheel before turning back the steering angle, than the upper limit change rate of the second driving wheel among the left driving wheel and the right driving wheel serving as the outer wheel before turning back the steering angle.

9. The control apparatus for the electric vehicle according to claim 8, wherein the circuitry is configured to reduce the left command torque or the right command torque on a basis of detection of slip of the left driving wheel or the right driving wheel.

* * * * *